No. 720,644. PATENTED FEB. 17, 1903.
S. J. WEBB.
BALE TIE.
APPLICATION FILED MAR. 9, 1898.
NO MODEL.
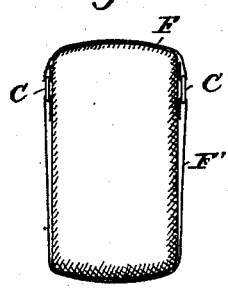
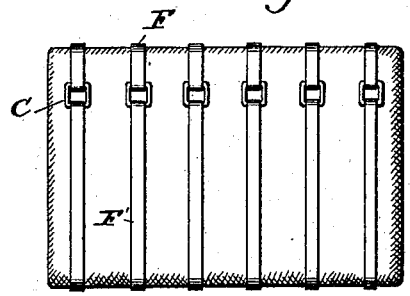
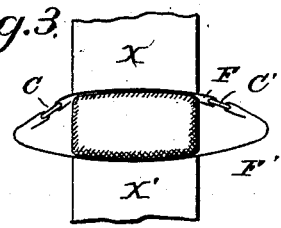
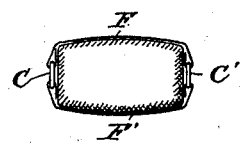
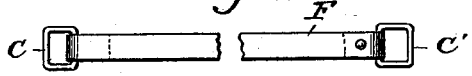
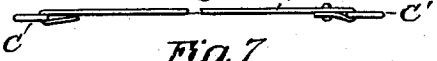
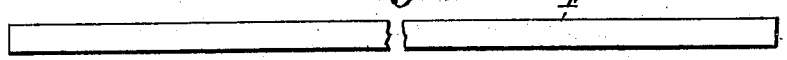
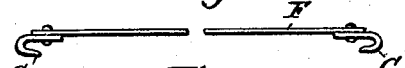
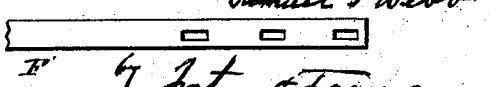

UNITED STATES PATENT OFFICE.

SAMUEL J. WEBB, OF MINDEN, LOUISIANA.

BALE-TIE.

SPECIFICATION forming part of Letters Patent No. 720,644, dated February 17, 1903.

Application filed March 9, 1898. Serial No. 673,232. (No model.)

*To all whom it may concern:*

Be it known that I, SAMUEL J. WEBB, a citizen of the United States, residing at Minden, in the parish of Webster and State of Louisiana, have invented certain new and useful Improvements in Baling Cotton, of which the following is a specification.

It is the common practice in baling cotton to first make a plantation-bale approximately about forty-eight inches in height and to secure this by means of bands each consisting of a long strip of metal passed around the bale while the latter is in the plantation-press, the ends being pushed through the grooves in the platens and then being connected together at one side by a suitable tie or fastening. When the bales so prepared are brought to the compress or flattening-press, the bands are taken off, the bale compressed, and then other bands are put upon the bale by passing the ends through the grooves in the platens and securing them together at one side of the bale or when the bale is compressed with the bands on the loops formed in the bands are cut away. These operations are attended with certain objections, among others with loss of labor, time, and material, which I avoid by the means hereinafter fully set forth, and illustrated in the accompanying drawings, in which—

Figure 1 is a side view of a plantation-bale banded in accordance with my improvement. Fig. 2 is an end view of the bale, Fig. 1. Fig. 3 is an end view illustrating the position of the bands after the plantation-bale has been compressed and before tightening the bands in carrying out my improvements. Fig. 4 is an end view of the compressed bale. Fig. 5 is a face view of one section of the improved baling-band; Fig. 6, an edge view of the said section. Fig. 7 is a face view of the other section; and Fig. 8 is an edge view, and Fig. 9 a plan view, of the two sections of the band of a different construction from that shown in Figs. 5, 6, and 7.

In carrying out my improvement I make use of bands each of which is in two sections F F'. The section F is but little longer than the width of the top of the bale. Assuming the latter to be thirty inches, the section F will be, say, thirty-six or thirty-eight inches in length, with fastening devices C C' at its opposite ends. The section F' is a straight strip of metal. After the bale has been compressed at the plantation the sections F are placed across the top, and the sections F' are carried beneath and up the sides and secured by the fastening devices C C'. This completes the baling at the plantation. When the bale is received at the press to be flattened, it is placed without removing the bands between the platens X X' of the press, which are then brought together until the bale is reduced to the proper thickness—say eight inches. This results in causing the side portions of the bands to swell out, as in Fig. 3. The ends of the strips F' are then seized and drawn through the fastening devices C C', when the latter are of a character to permit this operation, until the bands are tight at the opposite sides or edges of the bale, and the surplus portions of the strips F' are then cut away, leaving the bale in the shape shown in Fig. 4, each band consisting of two united strips of about the same length. By this mode of baling I avoid the necessity of making use of platens having grooves, which cut the cotton when the bale receives its final compression. I also avoid the loss of time and labor incident to passing the various bands through the grooves after the bale has been compressed in the final press, and I also avoid the loss of such portions of the bands as are cut off and wasted in the ordinary methods of baling.

While by the above-described mode of operation the ends of the strips or sections F' are cut off after the bale has been compressed, these are not wasted, as they are of sufficient length to be used in making the shorter sections F.

In Figs. 5 and 6 I have shown the short section F as provided with fastening devices C C' in the form of loops; but any suitable fastenings or ties may be used. In Fig. 8 I show them in the form of hooks, in which case the strip 10 will have a series of holes or slots therein.

Without limiting myself to the precise construction and arrangement of parts shown and described, I claim as my invention—

1. A bale-tie comprising a short section having a fastening device at each end, and a long section adapted to engage the fastening devices of the shorter section, said sections being so proportioned in length that when the tie is secured on a plantation-bale the respective fastening devices will lie against opposite sides of the bale near the top or bottom edges of the bale, substantially as and for the purpose set forth.

2. A bale-tie comprising a short section having a loop at each end, and a long section the ends of which are adapted to be received into and drawn through openings in the loops of the short section, said sections being so proportioned in length that when the tie is secured on a plantation-bale the respective loops will lie against opposite sides of the bale near the top or bottom edges of the bale, substantially as and for the purpose set forth.

In testimony whereof I have signed my name to this specification in the presence of two subscribing witnesses.

SAMUEL J. WEBB.

Witnesses:
W. CLARENCE DUVALL,
PAUL W. STEVENS.